United States Patent [19]
Artzer

[11] 3,888,723
[45] June 10, 1975

[54] MACHINE FOR ASSEMBLING A GASKET ASSEMBLY

[75] Inventor: Paul J. Artzer, Arvada, Colo.

[73] Assignee: Appleton Electric Company, Chicago, Ill.

[22] Filed: Oct. 10, 1973

[21] Appl. No.: 405,148

[52] U.S. Cl............. 156/499; 29/200 A; 113/80 R; 156/567; 156/262; 156/556
[51] Int. Cl...................... B32b 31/04; B21d 51/46
[58] Field of Search .......... 156/556, 557, 583, 566, 156/380, 362, 423, 275, 498, 293, 499, 294, 567, 298, 303.1, 538, 262, 539, 559, 580; 198/35; 285/DIG. 11; 113/80 C, 80 A, 80 BA, 80 R; 29/200 A; 219/243; 425/517

[56] References Cited
UNITED STATES PATENTS

| | | | |
|---|---|---|---|
| 2,731,071 | 1/1956 | Husum................................ | 156/293 |
| 2,834,394 | 5/1958 | Sharn et al......................... | 156/499 |
| 2,853,118 | 9/1958 | Schnitzius........................... | 425/517 |
| 2,907,300 | 10/1959 | Alholm et al....................... | 118/323 |
| 3,042,560 | 7/1962 | Lynch et al........................ | 156/567 |
| 3,045,819 | 7/1962 | Heidergott........................... | 198/24 |
| 3,095,344 | 6/1963 | Sandow............................... | 156/499 |

Primary Examiner—Charles E. Van Horn
Assistant Examiner—J. Gallagher
Attorney, Agent, or Firm—Darbo, Robertson & Vandenburgh

[57] ABSTRACT

The outer surface of a tube of elastomeric material is coated with a heat-sensitive adhesive. At spaced points the tube is sliced at an angle to the tube to form elastomeric washers having an outside wall coated with adhesive. Sheet metal is formed into a plurality of annular support members having a peripheral flange. A plurality of vertical mandrels are moved about a closed path. At a first location along the path an annular metal support member, being one of the components of the finished gasket, is loaded on the mandrel with its flange projecting upwardly. At a subsequent station an elastomeric washer having the peripheral adhesive coating is loaded onto the mandrel. At a later station a confinement is placed around the top of the flange of the support member and the elastomeric washer is pushed down through the confinement into the space within the flange of the support member. At a further station the support member is heated to activate the adhesive and cause the washer to become affixed to the support member.

17 Claims, 21 Drawing Figures

MACHINE FOR ASSEMBLING A GASKET ASSEMBLY

SUMMARY OF THE INVENTION

The present invention relates to a method and apparatus for inexpensively producing gaskets, particularly adapted for use in connection with electrical fittings, with little or no intervention of hand labor.

DESCRIPTION OF SPECIFIC EMBODIMENTS

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Figures 1, 2, 3, 4, 5:
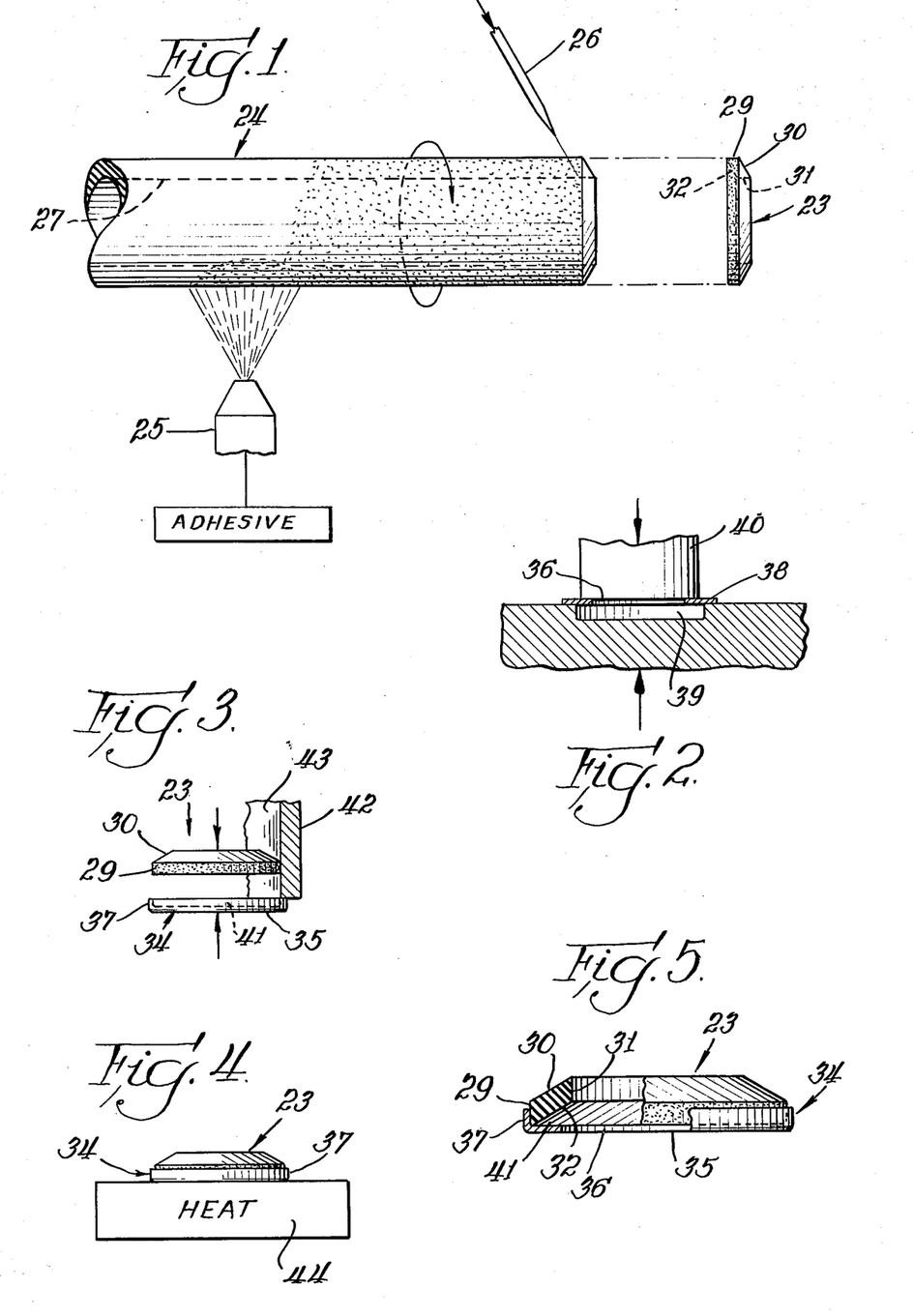
FIG. 1 is a diagrammatic view of the forming of the elastomeric washers.
FIG. 2 is a diagrammatic sectional view illustrating the forming of the support members.
FIG. 3 is a diagrammatic sectional view, with portions broken away, illustrating a step in the process of completing the gasket.
FIG. 4 is a diagrammatic elevational view illustrating a subsequent step in the forming of the gasket.
FIG. 5 is an elevational view, with portion broken away, illustrating the completed gasket.

FIG. 1 diagrammatically illustrates the formation of a plurality of elastomeric washers 23. Starting with a tube 24 of elastomeric material such as natural or synthetic rubber (e.g. chloroprene rubber sold under the trademark Neoprene), it is coated with a thermo-responsive adhesive, and more specifically a thermoplastic adhesive. While this might be done in several ways, FIG. 1 diagrammatically illustrates the tube 24 being rotated and adhesive being sprayed thereon by a spray gun 25. After the adhesive is set sufficiently so that it will not interfere with further operations, the end of the tube is repeatedly sliced (as by means of knife 26) at spaced intervals at an angle to the axis of the tube. Each slice is made from the outside wall through to the inner opening 27 of the tube. Since the tube is being rotated while this slicing takes place, each such slice produces a washer 23. The washer has an outer wall 29 coated with adhesive, an upper wall 30 of truncated conical configuration, an inner wall 31 and a lower wall 32 of truncated conical configuration.

The second component of the gasket is a relatively rigid support member, normally formed of metal (e.g. iron with a zinc coating), but which could be made of a relatively rigid plastic. Each such member 34 has a base 35 with an opening 36 therein and an upwardly extending peripheral flange 37. As is known to those skilled in the art, the manufacture of such support members can be carried out in diverse ways. As for example, FIG. 2 illustrates a washer 38 of appropriate size being pressed into a cavity 39 in a die by a ram 40, thereby bending the flanges 37 upwardly from the remainder of the material which will form the base 35.

In assembling the gasket, a washer 23 is placed above a support member 34, as illustrated in FIG. 3, and the two axially aligned. In the apparatus hereinafter described this is done by placing the two on a mandrel. The use of the mandrel is also advantageous in that it forms a support against inward deformation of the washer. The washer is confined about the wall 29 thereof to a circular area corresponding (or approximately so) to the circular area within the inner walls of flange 37. When this confinement is accomplished and the circular areas are coaxial, forces are applied to the washer and the support member to force them together, as illustrated by the arrows in FIG. 3. The confinement may be by means of an annular ring 42, the inner wall 43 of which has a diameter corresponding to the diameter of the space 41. During the assembly the support member is restrained against radial movement. In the illustrated embodiment this is also accomplished by the mandrel.

The support member 34 is now heated. This heat is transmitted through the support member to the adhesive on outer wall 29 which is in contact with the inner wall of flange 37. Thereby the adhesive is heated and activated to achieve a bond between the walls 29 and the inner wall of flange 37 (at least upon cooling). This heating may be accomplished by placing the support member 34 on a heated plate 44, as illustrated in FIG. 4. After the adhesive had been activated sufficiently, e.g. softened to a tacky consistency, the assembly is removed from the heated plate 44 and cooled either by exposure to ambient atmosphere, by placing it on a chilled plate, by blowing refrigerated air thereon, etc. This would solidify the adhesive and complete the assembly operation to produce a gasket as disclosed and claimed in my application GASKET ASSEMBLY filed Oct. 10, 1973, Ser. No. 405,149, the disclosure of which is included herein by reference.

FIGS. 6–18 illustrate an apparatus for automatically performing the assembly operation of mating the washer and the support member into a finished gasket. The apparatus comprises a frame, generally 47, having the configuration of a table. There is a conveyor, generally 46, which moves about a closed path. This conveyor includes a chain 48 which is aligned and supported by sprockets 49–52. Sprocket 52 is connected to an air-oil indexing unit 54. This moves the chain in the direction indicated by arrow 55 a given distance, with a given period of dwell between each movement. These are adjustable. Such indexing units are an "off-the-shelf" component and will not be described in detail.

Figures 11, 12, 13, 14, 15, 21:
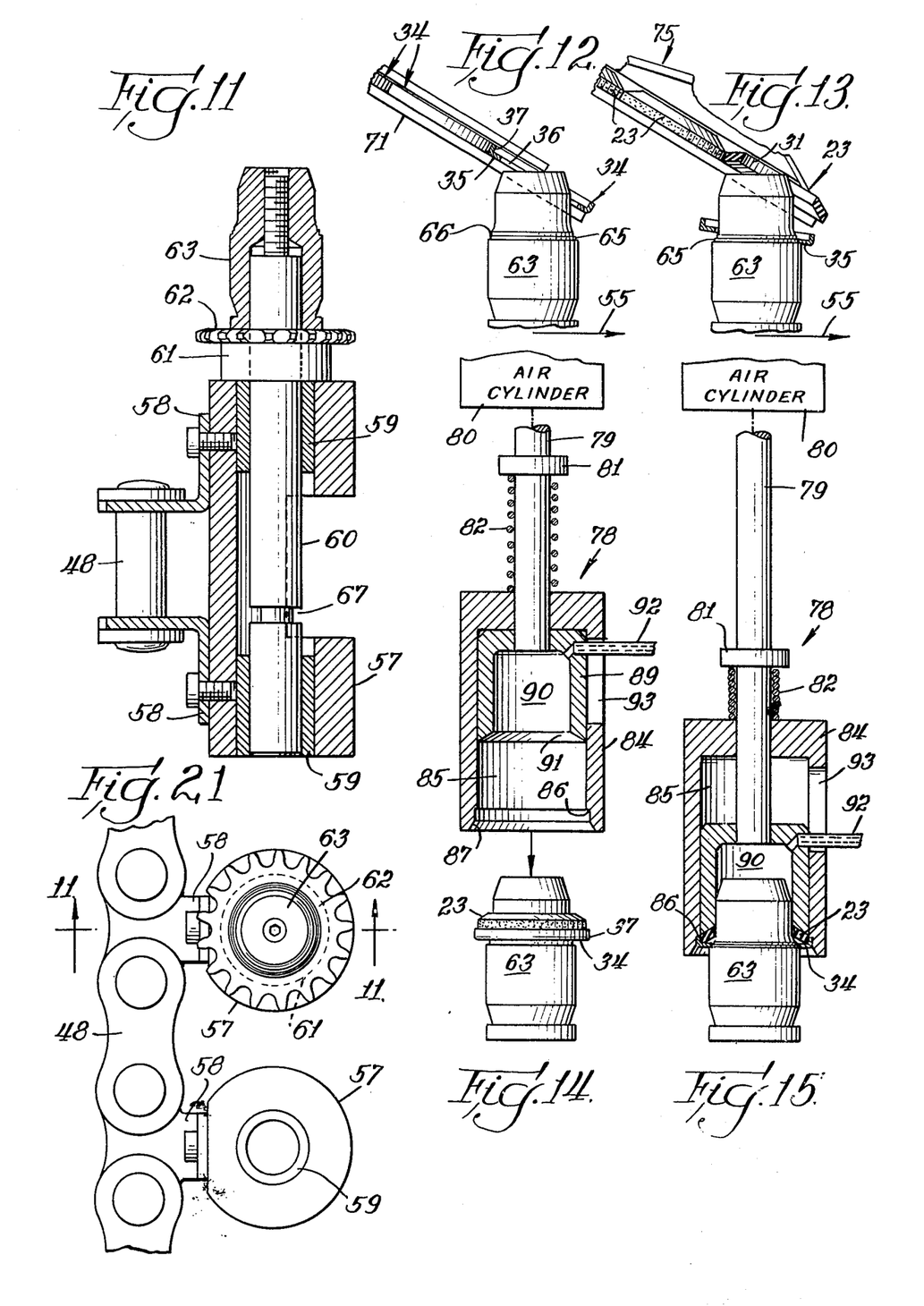
FIG. 11 is a section as seen at line 11—11 of FIG. 21.
FIG. 12 is an elevational view of a portion of the top of a mandrel illustrating the loading of a support member thereon.
FIG. 13 is a view corresponding to FIG. 12 illustrating the loading of the washer onto the mandrel already carrying the support member.
FIG. 14 is a view of the mandrel corresponding to FIGS. 12 and 13 and illustrating in section the apparatus for confining and inserting the washer into the support member.
FIG. 15 is a view corresponding to FIG. 14, but illustrating the washer after being forced into the support member.
FIG. 21 is an enlarged plan view of the conveyor and the mandrels mounted thereon.

As best seen in FIGS. 11 and 21, the conveyor includes a mount 57 secured to angles 58 forming some of the links of the chain 48. Each mount includes bearings 59 which define a vertical opening to receive a post 60. At the top of the post is a hub 61, a sprocket 62 and a mandrel 63, all secured to the post. The mandrel has a cylindrical portion 65 of substantially the same diameter as the diameter of the inner opening 36 of support member 34. Below the cylindrical portion 65 the mandrel is enlarged to form an abutment 66. Above the cylindrical portion 65 the mandrel is generally smaller in diameter. The post 60 has an annular slot 67 therein for use in adjusting the height of the mandrel as hereinafter described.

At a first point along the path of movement of the mandrels is a device, generally 70, for feeding the support members to the mandrel. Such feeding devices are conventional and thus will not be described in detail. It terminates in a chute 71. At the bottom of the chute are a pair of ears 72 which normally restrain the lowermost support member 34 on the chute from leaving the end of the chute. Other support members will be lined up on the chute behind the lowermost one. The support members are randomly deposited into the feeding device 70 which directs them into the chute 71, all with their bases 35 down on the chute. With reference to FIG. 12, when a mandrel passes the bottom of chute 71 the top of the mandrel enters into the opening 36 in the support member and as the mandrel continues moving in the direction 55 it pulls that support member with it, the ears 72 being resilient to permit the support member to be so drawn away from the chute. Upon leaving the chute, that support member then falls down onto the mandrel, perhaps in the position illustrated in FIG. 13.

At a second position along the path of movement of the mandrels is a second feeding device, generally 74, for supplying the washers to the mandrels one at a time. This includes a chute 75 down which the washers 23 descend in sequence. Each washer is arranged by the feeding device 74 so that its lower wall 32 is adjacent the surface of the chute and its upper wall 30 is upwardly. The chute has resiliently mounted wings 76 at the bottom thereof to restrain the lowermost washer. Other washers will be in serial order up the chute. With reference to FIG. 13, as the mandrel 63, already having a support member 34 thereon, moves below the bottom of chute 75 it enters the opening within inner wall 31 of the washer. As the mandrel thereafter moves in the direction indicated by arrow 55 it draws that washer with it, brushing aside the wings 76 to permit the washer to exit. The removed washer thereupon falls onto the mandrel. The remaining washers in the chute move down one position.

At a subsequent location along the path in which the mandrels move is a positioning means, generally 78, for putting the washer into the support member. In the illustrated embodiment the indexing mechanism 54 moves the chain, between dwells, a distance equal to three mandrel positions. Thus three positioning means 78 are employed to operate on each of the three mandrels which are stationary at that location during a dwell. It would be possible to have a continuously moving conveyor 46 and move the positioning means 78 with the conveyor for a short distance while the positioning means was doing its thing, but I prefer to employ an intermittently moving conveyor as described herein. Each positioning means includes a vertical rod 79 which is movable vertically and connected to an air cylinder 80 to be moved thereby. The rod has an abutment 81 thereon. A spring 82 is in compression between the abutment and the top of a positioning member 84. The positioning member has a cylindrical cavity 85 therein. The positioning member 84, adjacent its bottom, has an outward step 86. A short distance below the step there is an outward flare 87 in the wall of the member and thus in the cavity. The portion of the cavity immediately below the step 86 is just slightly larger in diameter than the outside diameter of flange 37 of rigid member 34. The diameter of the cavity just above the step 86 is substantially the same as the diameter of the inner wall of flange 37.

Within cavity 85 is a plunger 89. This plunger has an internal opening 90 and a bottom face 91 which is of substantially the same configuration as upper wall 30 of the washer 23. This plunger is secured to rod 79. The internal opening 90 communicates with a tube 92. Tube 92 extends through a slot 93 in the side wall of positioning member 84. This tube is to prevent a vacuum from occurring within opening 90 during the operation of the device. In some embodiments air under pressure may be supplied to tube 92 to further this purpose and to ensure that the gasket remains on the mandrel when the positioning member ascends away from the mandrel.

The air cylinders 80 and the indexing mechanism 54 are both air actuated. This is done through air valves (not shown) controlled by an electrical timing device so that the air cylinders 80 actuate the positioning means during a dwell period of the conveyor 46 and hold the positioning means up out of the way during a period of conveyor movement.

Figure 16:
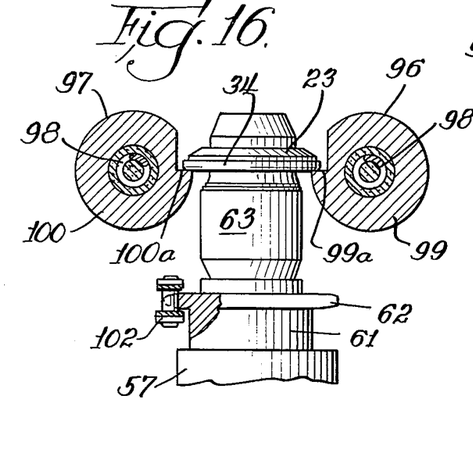
FIG. 16 is an elevational view of the top of the mandrel carrying the gasket and including in vertical section the heaters for heating the support member.
Figure 17:
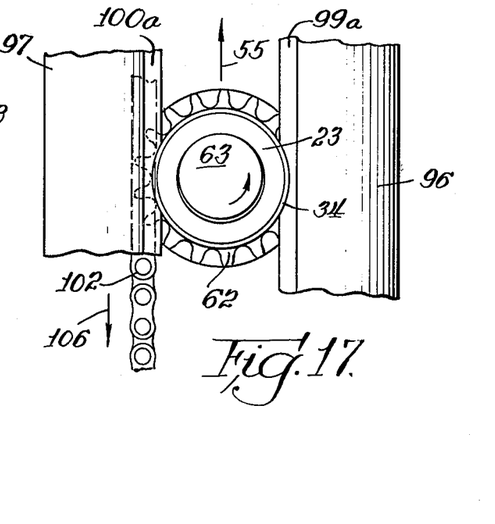
FIG. 17 is a plan view of the structure illustrated in FIG. 16.

At the next station along the path of movement of the mandrels are a pair of heaters 96 and 97 mounted on adjustable supports generally 94 and 95 respectively. These heaters have a central heating element 98 surrounded by insulation, etc., and a heavy outer metallic jacket 99 and 100. These jackets each have a step therein to define platforms 99a and 100i a. At the entrance end of the heaters (i.e. the right end in FIG. 6) the level of the platforms 99a and 100a is below the bottom of the rigid member 34 as it rests on the mandrel. Thereafter there is an upward incline in the heaters so that the platforms raise the rigid member part way up on the mandrel, as illustrated in FIG. 16.

Extending along the path of the mandrels as they pass between the heaters 96 and 97 is one run of an endless chain 102. This chain extends between sprockets 103 and 104. Sprocket 103 is mounted on the output shaft of a speed reduction unit on the end of a small variable speed motor 105. This run of chain 102 is at an elevation such that the chain engages sprocket 62 forming a part of the mandrel structure. The chain rotates the sprocket 62, thus rotating the mandrel 63. Even if the chain 102 is held stationary (which will be done in some instances) the movement of the mandrel along the chain will cause the sprocket 62 to rotate, thus rotating the mandrel. To speed up the rotation of the mandrel the chain can be driven by motor 105 in the direction indicated by arrow 106. By friction, the rotation of the mandrel 63 rotates the rigid member 34. This results in the heat applied to the member 34 by the heaters being more evenly distributed in the member than would be the case were it to remain stationary. As previously described, the heating of the rigid member activates the adhesive on the washer.

Figure 6:
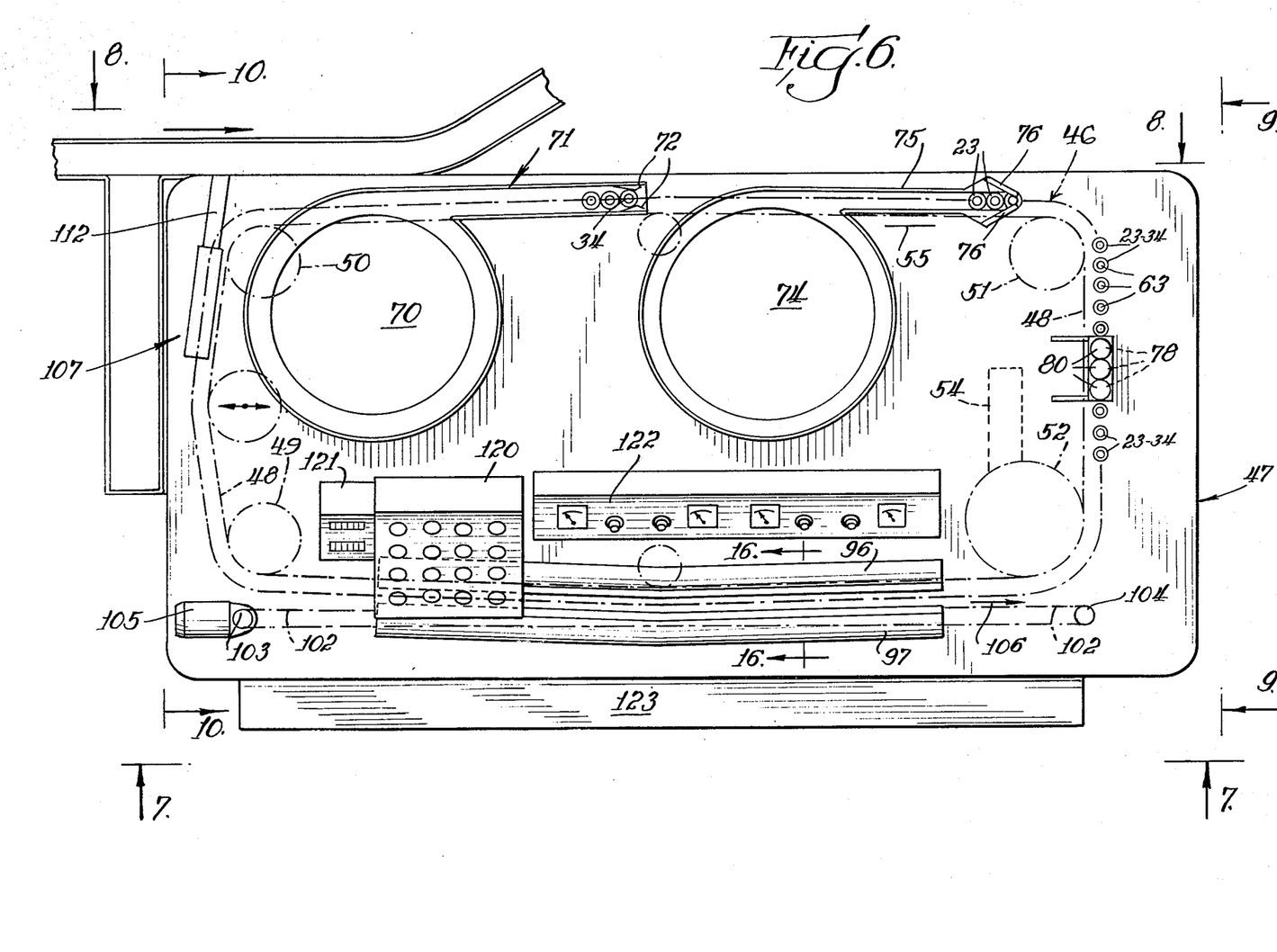
FIG. 6 is a plan view of an apparatus for assembling the gaskets.
Figure 7:
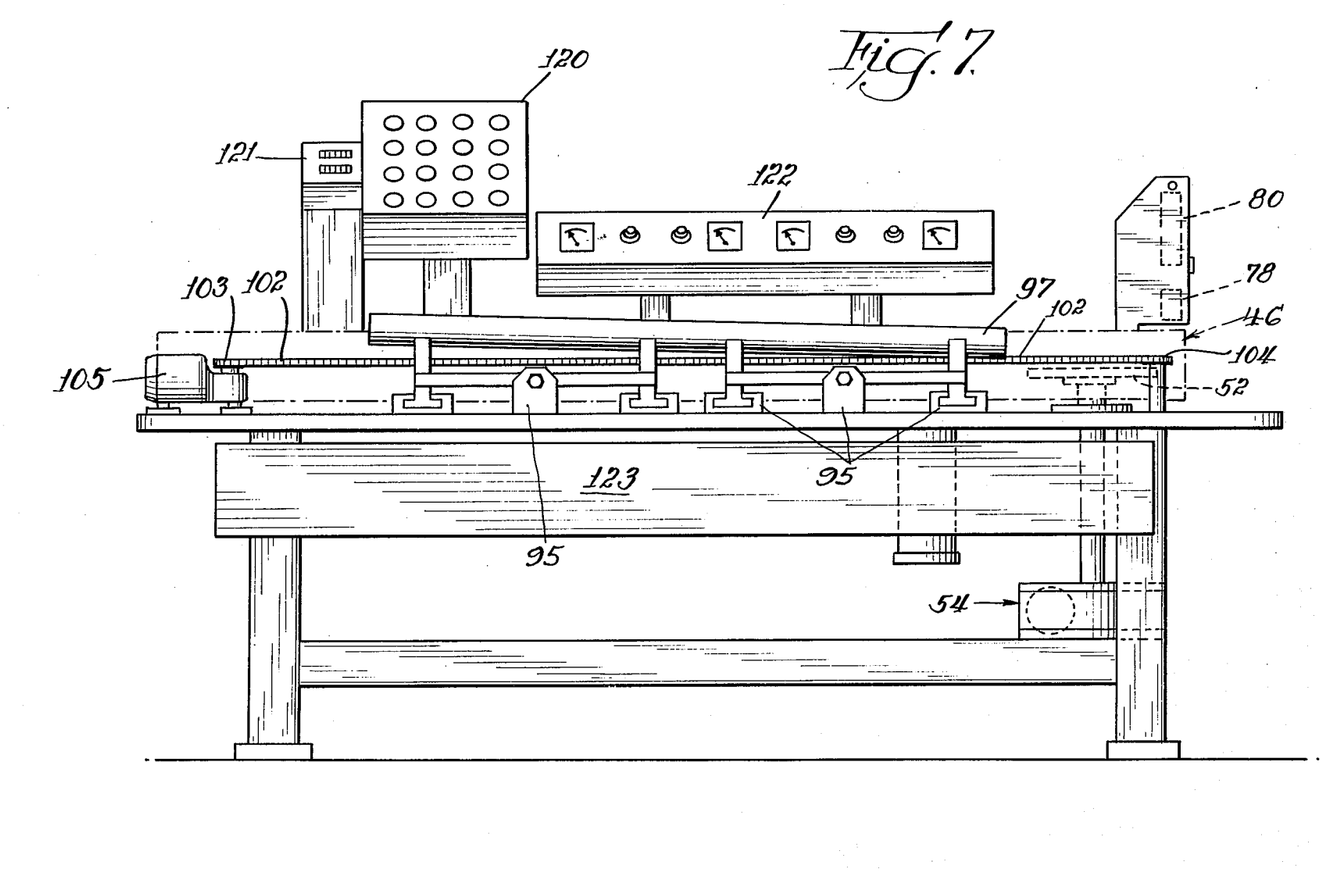
FIG. 7 is a side elevational view as seen at lines 7—7 of FIG. 6.
Figure 8:
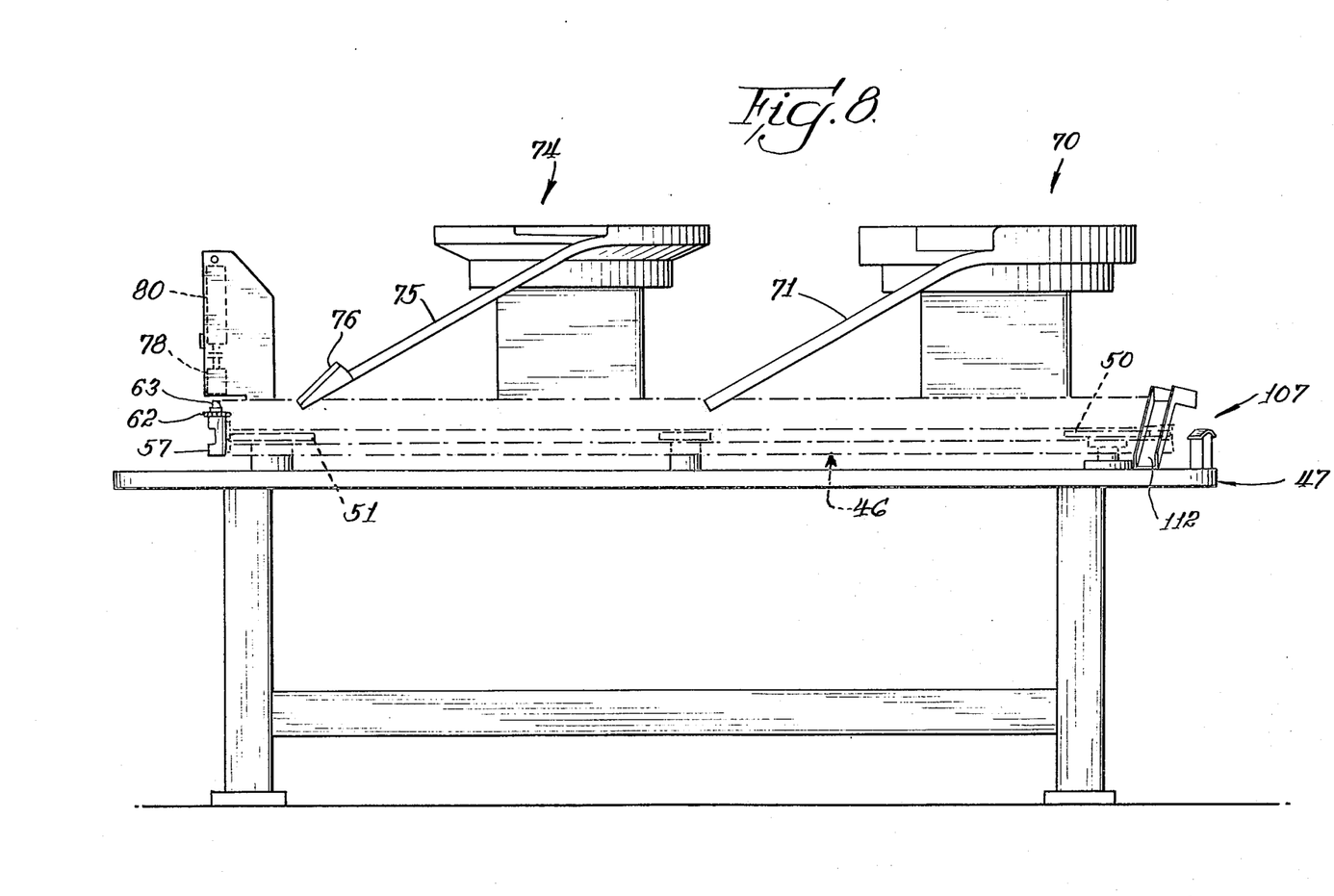
FIG. 8 is a side elevational view as seen at line 8—8 of FIG. 6.
Figure 9:
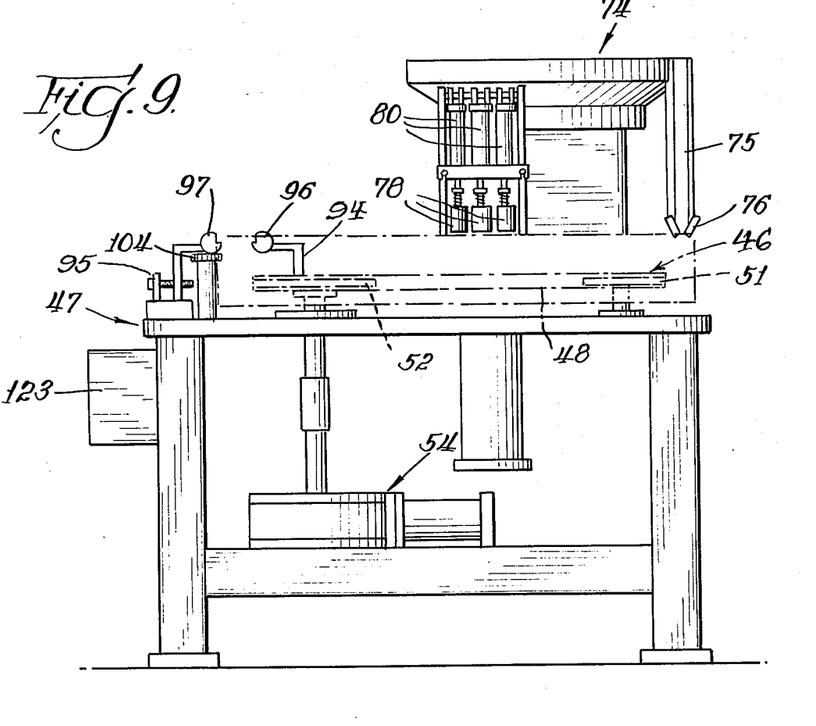
FIG. 9 is an end elevational view as seen at line 9—9 of FIG. 6.

After leaving the heaters the mandrels move along an area of the path within which the gaskets are contacted by ambient air to cool the gaskets. This cooling results in the adhesive causing a secure bonding between the washers and the rigid members. The area in question of the path is that part beyond the heaters within which the sprocket 49 is generally centered (FIG. 6).

Figure 10:
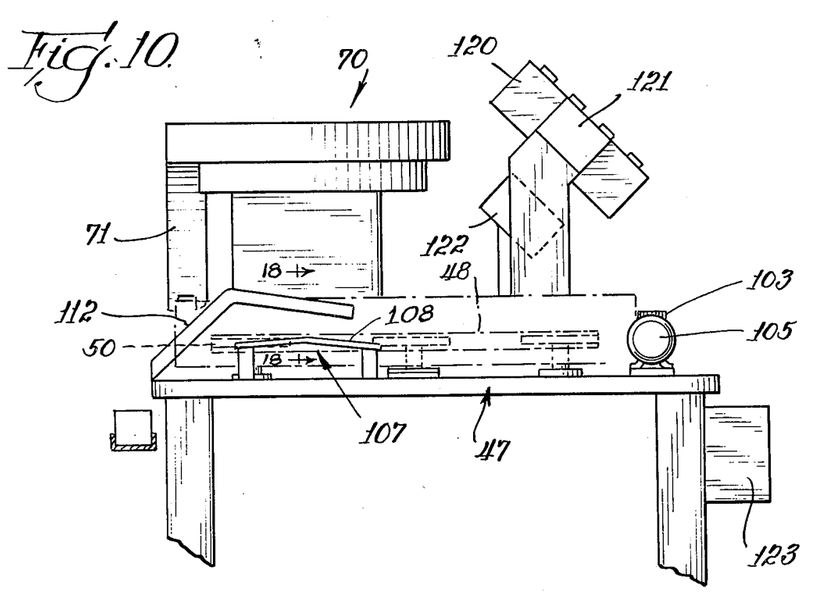
FIG. 10 is a partial end elevational view as seen at line 10—10 of FIG. 6.
Figure 18:
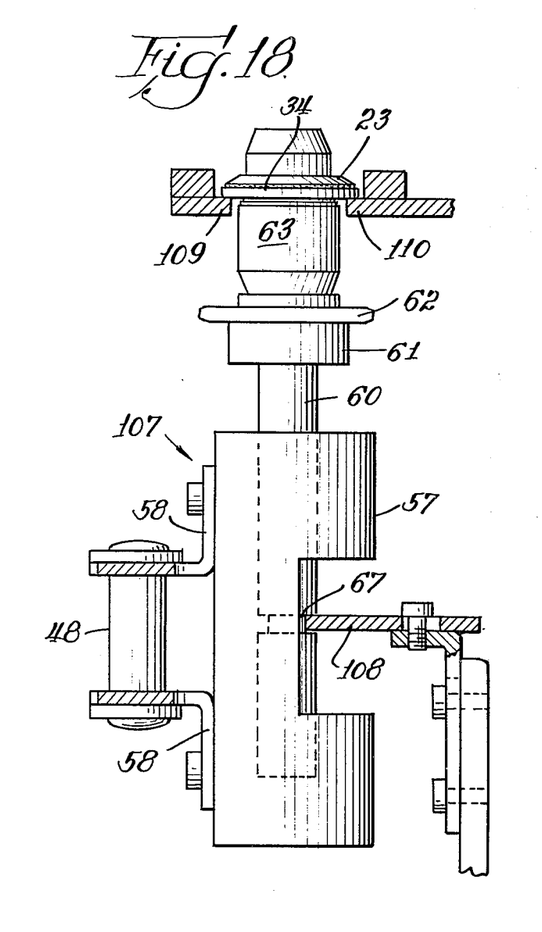
FIG. 18 is a vertical section as seen at line 18—18 of FIG. 10 and showing the apparatus for removing the completed gasket from the mandrel.

At the final station along the path the gaskets 23, 34 are removed from the mandrels. To this end there is a removal device which comprises a cam 108 and a platform defined by plates 109 and 110 (FIG. 18). As seen in FIG. 10, the first half of cam 108 slants upwardly. Thus the cam enters the slot 67 on post 60. As the post moves to the left, as seen in FIG. 10, the upward slant of the cam 108 raises post 60. At about the same time the mandrel 63 enters between plates 109 and 110, with the entrance end of the plates being below the bottom of the gaskets 23, 24. Moving further along the path the cam 108 commences descending. This lowers post 60 and mandrel 63. This in conjunction with the upward slant of plates 109 and 110 leaves the gaskets 23, 34 on those plates and free of the mandrel. Nearly up until reaching the downward chute 112 the gaskets are assisted in their forward movement by contact with the mandrel. However, the final movement to the chute 112 is free of the mandrels 63 and the gaskets being assisted in their forward movement by a blast of air from nozzle 113.

Figure 19:
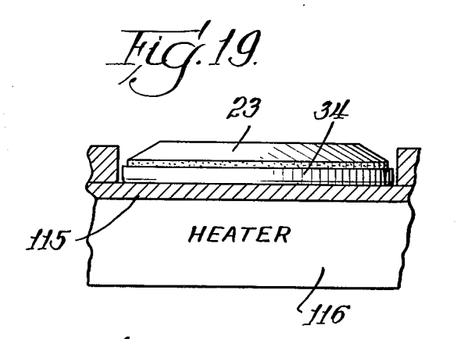
FIG. 19 is a vertical section of an alternative apparatus for heating the support member.
Figure 20:
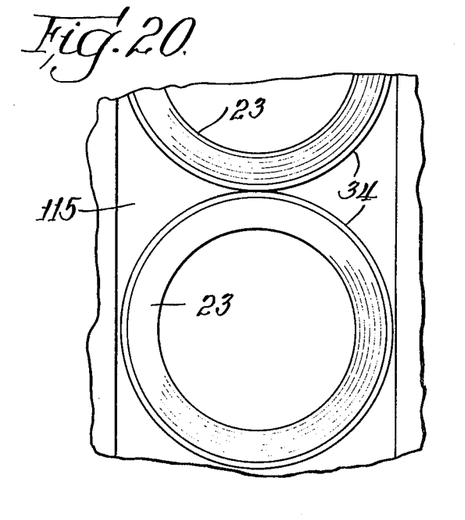
FIG. 20 is a plan view of the apparatus of FIG. 19.

FIGS. 19 and 20 illustrate a modification for heating the rigid members 34 and activate the adhesive and bond the washers 23 thereto. In this embodiment, after leaving the positioning means 78 a path of the chain would be through an unloading device 107 such as that described; that is, the heaters 96 and 97 would be eliminated from the previously described embodiment. After being removed from the mandrel, the rigid members 34 with the washers 23 therein would be moved by a power driven device, not shown, across a plate 115. This plate would be kept at the required temperature by a heater 116. After the rigid member 24 had been sufficiently heated to activate the adhesive, the rigid members would be withdrawn from the heat and cooled to complete the gaskets 23, 34.

In the initially described embodiment there is a control panel 120 having controls for the motors, etc., by which the speed, etc., may be adjusted. There is a counter 121 to advise as to the number of gaskets that have been made. The panel 122 carries the heater controls and temperature indicators. The unit 123 is a wiring box.

OPERATION

The washers 23 are loaded into the feeding device 74 in random fashion. The support members 34 are similarly loaded into the feeding device 70. As previously described, these feeding devices move the support members 34 to the bottom of chute 71 and the washers 23 to the bottom of chute 75, both being regularly aligned. The mandrels 63 are moved in jumps with a dwell between each jump. During each jump each mandrel moves three mandrel spaces forward. As they move forward the mandrels first pick up a rigid member from chute 71 in the manner illustrated in FIG. 12. At a subsequent station they pick up a washer 23 from chute 75 in the manner illustrated in FIG. 13. The mandrels carrying the rigid members and washers are moved to the positioning means 78. As the rod 79 moves downwardly it first lowers the positioning member 84. The positioning member moves down about the washer 23 so that the step 86 seats on the top of flange 37. The washer 23 is trapped within cavity 85 which confines the washer to the configuration of the space 41 within flanges 37 of the rigid member. When the positioning member 84 can move down no further, the continued descent of rod 79 results in spring 82 compressing and the plunger 89 moving down about the mandrel to force the washer into the rigid member. Thereafter the rod 79 moves upwardly. During the initial part of this movement there is a danger of a vacuum within opening 90 lifting the washer 23 alone or with the member 34. To prevent this possibility air is introduced through tube 92. After the positioning member 78 is completely free of the mandrel 63 (the position illustrated in FIG. 14) the dwell ends and the mandrel again makes a forward jump.

In its continued forward movement the loaded mandrels pass between heaters 96 and 97. Here the rigid members 34 are rotated while in contact with the heaters. The heating activates the cement on the outer wall 29 of the washers. Upon being allowed to cool the washers are securely bonded to the rigid members to form a gasket 23, 34. These gaskets then move to station 107 where they are lifted off the mandrels and discharged through chute 112.

To make larger gaskets, the post 60 of the mandrel is removed from the mount 57. The post of a different, appropriately sized mandrel is reinserted into the mount. In some instances, a fewer number of mandrels will be employed because of the required larger size. This is done, for example, by skipping every other mount 57. Appropriately sized positioning means 78 must be substituted for those previously used. The spacing between heaters 96 and 97 is changed through the manipulation of adjustable mounts 94, 95.

I claim:

1. An apparatus for forming gaskets, each of which comprises an elastomeric washer having an axial opening therein and a cylindrical outer face and a rigid support member having an axial opening therethrough and a peripheral flange with an inner face, one of said faces having a thermo-responsive adhesive thereon, said apparatus comprising:

a frame;

endless conveyor means mounted on said frame and trained for movement in a given direction along a closed path, said conveyor having a plurality of vertically positioned mandrels with their distal ends upwardly, said mandrels being removably mounted, and including a second set of mandrels of a different diameter for use in forming gaskets of a second size;

power means connected to said conveyor means for moving the conveyor means in a given direction, said power means periodically indexing said conveyor means with a dwell between each indexing movement, the amount of the indexing movement being a multiple of the distance between adjacent mandrels;

first feeding means mounted on said frame and positioned at a first point along said path for positioning a support member with the flange upwardly on a mandrel as that mandrel is at said first point;

second feeding means mounted on said frame and positioned at a second point, in said direction from said first point, for positioning a washer on the mandrel above the support member as the mandrel carrying the support member is at said second point;

positioning means mounted on said frame and positioned above said path at a point at which mandrels carrying support members and washers move below it, said positioning means being movable downwardly over the mandrel for seating the washer into the member on the mandrel, said positioning means performing said downward movement during a dwell period; and means on said frame for heating the support member for activating said adhesive.

2. An apparatus for forming gaskets, each of which comprises an elastomeric washer having an axial opening therein and a cylindrical outer face and a rigid support member having an axial opening therethrough and a peripheral flange with an inner face, one of said faces having a thermo-responsive adhesive thereon, said apparatus comprising:

a frame;

endless conveyor means mounted on said frame and trained for movement in a given direction along a closed path, said conveyor having a plurality of vertically positioned mandrels with their distal ends upwardly;

power means connected to said conveyor means for moving the conveyor means in a given direction;

first feeding means mounted on said frame and positioned at a first point along said path for positioning a support member with the flange upwardly on a mandrel as that mandrel is at said first point;

second feeding means mounted on said frame and positioned at a second point, in said direction from said first point, for positioning a washer on the mandrel above the support member as the mandrel carrying the support member is at said second point;

positioning means mounted on said frame and positioned above said path at a point at which mandrels carrying support members and washers move below it, said positioning means being movable downwardly over the mandrel for seating the washer into the member on the mandrel; and means on said frame for heating the support member for activating said adhesive, said heating means being positioned along a portion of said path in said direction from said positioning means and comprising heated plates at each side of the mandrels and at an elevation with respect to the conveyor means that the support member rides on said plates.

3. An apparatus as set forth in claim 2, including means having a portion connected to the mandrels for rotating the mandrels when the mandrels are passing between said plates.

4. An apparatus as set forth in claim 3, wherein the last mentioned means includes sprockets secured to the mandrels respectively, a chain extending along the portion of the path at which said plates are located, and positioned to engage the sprockets moving therealong, and means connected to said chain for holding the chain stationary and for moving the chain along the path.

5. An apparatus as set forth in claim 4, including means positioning along said path at a location in said direction from said portion of the path for removing the gaskets from the mandrel.

6. An apparatus as set forth in claim 5, wherein said conveyor means includes an endless chain, means mounting the mandrels to the endless chain for vertical movement of the mandrels with respect to the chain, cam means engaging said mounting means at said location for raising the mandrels at an initial point and for lowering the mandrels at a subsequent point in said direction from said initial point, support means between said initial and subsequent points to receive the gasket after it is raised by the mandrel and continue to hold the gasket after the mandrel has lowered thereby separating the mandrel and gasket.

7. An apparatus as set forth in claim 6, wherein said positioning means includes a positioning member having a cylindrical cavity therein of substantially the same radius as that of the inner face of said support member, said positioning member being positioned above the mandrel with the cavity axis concentric with the mandrel axis, the bottom of said positioning member being open and being flared outwardly below said cavity, a plunger in said cavity and movable in said cavity in an axial direction, said plunger having a lower face complementary to the upper face of said washer, and driving means connected to said positioning member and plunger for moving the positioning member down against the top of the rigid member therey confining said washer within said cavity and thereafter moving said plunger down to press the washer into the space within the flange and seat the washer onto the rigid member.

8. An apparatus as set forth in claim 7, wherein said plunger has a central opening extending upwardly from the bottom thereof and within said lower face thereof whereby the plunger can slip downwardly over the top of the mandrel, said plunger including means for venting said central opening.

9. An apparatus for forming gaskets, each of which comprises an elastomeric washer having an axial opening therein and a cylindrical outer face and a rigid support member having an axial opening therethrough and a peripheral flange with an inner face, one of said faces having a thermo-responsive adhesive thereon, said apparatus comprising:

a frame;

endless conveyor means mounted on said frame and trained for movement in a given direction along a closed path, said conveyor having a plurality of vertically positioned mandrels with their distal ends upwardly;

power means connected to said conveyor means for moving the conveyor means in a given direction;

first feeding means mounted on said frame and positioned at a first point along said path for positioning a support member with the flange upwardly on a mandrel as that mandrel is at said first point;

second feeding means mounted on said frame and positioned at a second point, in said direction from said first point, for positioning a washer on the mandrel above the support member as the mandrel carrying the support member is at said second point;

positioning means mounted on said frame and positioned above said path at a point at which mandrels carrying support members and washers move below it, said positioning means being movable downwardly over the mandrel for seating the washer into the member on the mandrel, said positioning means including a positioning member having a cylindrical cavity therein of substantially the same radius as that of the inner face of said support member, said positioning member being positioned above the mandrel with the cavity axis concentric with the mandrel axis, the bottom of said positioning member being open and being flared outwardly below said cavity, a plunger in said cavity and movable in said cavity in an axial direction, said plunger having a lower face complementary to the upper face of said washer, and driving means connected to said positioning member and plunger for moving the positioning member down against the top of the rigid member thereby confining said washer within said cavity and thereafter moving said plunger down to press the washer into the space within the flange and seat the washer onto the rigid member; and means on said frame for heating the support member for activating said adhesive.

10. An apparatus as set forth in claim 9, wherein said plunger has a central opening extending upwardly from the bottom thereof and within said lower face thereof whereby the plunger can slip downwardly over the top of the mandrel, said plunger including means for venting said central opening.

11. An apparatus as set forth in claim 10, wherein said power means periodically indexes said conveyor means with a dwell between each indexing movement, the amount of the indexing movement being a multiple of the distance between adjacent mandrels, said driving means and said power means being interconnected so that said plunger and positioning member are lowered during a dwell and are raised when the conveyor means is executing and indexing movement.

12. An apparatus as set forth in claim 9, including means positioned along said path at a location in said direction from said positioning means for removing the gaskets from the mandrel.

13. An apparatus as set forth in claim 12, wherein said heating means is beyond, in the direction of movement of the gaskets, said gasket removing means, said heating means comprising a flat surface in contact with the base of the rigid member.

14. An apparatus as set forth in claim 12, wherein said heating means is positioned along said path between said positioning means and said removing means and comprises heated plates at each side of the mandrels and at an elevation with respect to the conveyor means that the support member rides on said plates.

15. An apparatus as set forth in claim 14, including means having a portion connected to the mandrels for rotating the mandrels when the mandrels are passing between said plates.

16. An apparatus as set forth in claim 15, wherein the last mentioned means includes sprockets secured to the mandrels respectively, a chain extending along the portion of the path at which said plates are located, and positioned to engage the sprockets moving therealong, and means connected to said chain for holding the chain stationary and for moving the chain along the path.

17. An apparatus for forming gaskets, each of which comprises an elastomeric washer having an axial opening therein and a cylindrical outer face and a rigid support member having an axial opening therethrough and a peripheral flange with an inner face, one of said faces having a thermo-responsive adhesive thereon, said apparatus comprising:

a frame;

endless conveyor means mounted on said frame and trained for movement in a given direction along a closed path, said conveyor having a plurality of vertically positioned mandrels with their distal ends upwardly, said conveyor means including an endless chain, means mounting the mandrels to the endless chain for vertical movement of the mandrels with respect to the chain;

power means connected to said conveyor means for moving the conveyor means in a given direction;

first feeding means mounted on said frame and positioned at a first point along said path for positioning a support member with the flange upwardly on a mandrel as that mandrel is at said first point;

second feeding means mounted on said frame and positioned at a second point, in said direction from said first point, for positioning a washer on the mandrel above the support member as the mandrel carrying the support member is at said second point;

positioning means mounted on said frame and positioned above said path at a point at which mandrels carrying support members and washers move below it, said positioning means being movable downwardly over the mandrel for seating the washer into the member on the mandrel;

means on said frame for heating the support member for activating said adhesive; and means positioned along said path at a location in said direction from said positioning means for removing the gaskets from the mandrel and comprising cam means engaging said mounting means at said location for raising the mandrels at an initial point and for lowering the mandrels at a subsequent point in said direction from said initial point, and support means between said initial and subsequent point to receive the gasket after it is raised by the mandrel and continue to hold the gasket after the mandrel has lowered thereby separating the mandrel and gasket.

* * * * *

UNITED STATES PATENT OFFICE
CERTIFICATE OF CORRECTION

PATENT NO. : 3,888,723
DATED : June 10, 1975
INVENTOR(S) : Paul J. Artzer

It is certified that error appears in the above-identified patent and that said Letters Patent are hereby corrected as shown below:

Column 4, line 61, "100i a" should read --100a--.
Column 8, line 21, "positioning" should read --positioned--.
Column 8, line 49, "therey" should read --thereby--.

Signed and Sealed this sixteenth Day of September 1975

[SEAL]

Attest:

RUTH C. MASON
Attesting Officer

C. MARSHALL DANN
Commissioner of Patents and Trademarks